(12) United States Patent
Fulkerson et al.

(10) Patent No.: US 8,209,450 B2
(45) Date of Patent: Jun. 26, 2012

(54) MAINTENANCE OPERATIONS USING CONFIGURABLE PARAMETERS

(75) Inventors: Christopher Ryan Fulkerson, Longmont, CO (US); Paul Francis Kusbel, Longmont, CO (US)

(73) Assignee: Seagate Technologies LLC, Cupertino, CA (US)

( * ) Notice: Subject to any disclaimer, the term of this patent is extended or adjusted under 35 U.S.C. 154(b) by 123 days.

(21) Appl. No.: 12/547,884

(22) Filed: Aug. 26, 2009

(65) Prior Publication Data

US 2011/0055431 A1    Mar. 3, 2011

(51) Int. Cl.
   *G06F 3/00* (2006.01)
(52) U.S. Cl. .................. 710/58; 710/1; 710/59
(58) Field of Classification Search ............. 710/1, 5, 710/7, 20, 36, 39, 40, 58, 59, 61, 260, 264, 710/265; 711/100–173
See application file for complete search history.

(56) References Cited

U.S. PATENT DOCUMENTS

| | | | |
|---|---|---|---|
| 5,640,529 A * | 6/1997 | Hasbun | 711/103 |
| 6,065,088 A | 5/2000 | Bronson et al. | |
| 6,345,327 B1 | 2/2002 | Baskey et al. | |
| 7,315,917 B2 * | 1/2008 | Bennett et al. | 711/103 |
| 7,797,498 B2 * | 9/2010 | Jung et al. | 711/154 |
| 8,032,724 B1 * | 10/2011 | Smith | 711/159 |
| 2007/0005896 A1 | 1/2007 | Chang et al. | |
| 2007/0088895 A1 | 4/2007 | Gustafson et al. | |

OTHER PUBLICATIONS

T13/1699-D Information technology—AT Attachment 8—ATA/ATAPI Command Set (ATA8-ACS); Sep. 6, 2008; Revision 6a; p. 232.*
Hitachi Global Storage Technologies, Hard Disk Drive Specification, Hitachi Travelstar 5K320, pp. 1-177, Apr. 3, 2008.

* cited by examiner

*Primary Examiner* — Richard B Franklin
(74) *Attorney, Agent, or Firm* — Hollingsworth & Funk, LLC

(57) ABSTRACT

The present disclosure relates to performing maintenance operations in a data system using configurable parameters. In one embodiment, a method in a data system is provided. The method includes receiving an indication of a data latency threshold and performing at least one maintenance operation in the data system based on the data latency threshold.

21 Claims, 5 Drawing Sheets

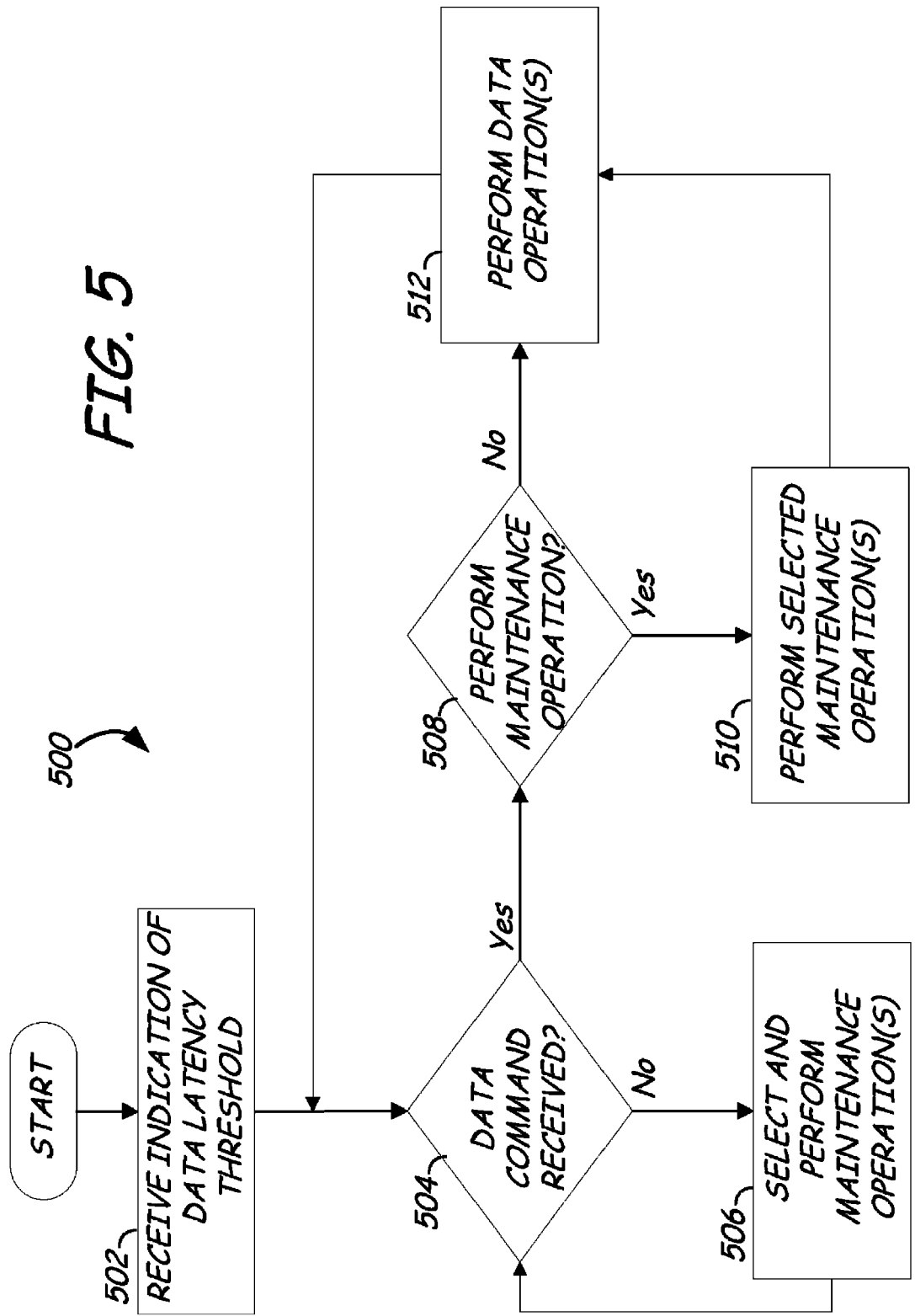

MAINTENANCE OPERATIONS USING CONFIGURABLE PARAMETERS

BACKGROUND

The present disclosure relates generally to maintenance operations within data systems and more specifically, but not by limitation, to using configurable parameters to perform maintenance operations in a data storage system.

Data systems typically include components configured to process, access, store, and/or communicate data, for example. Exemplary data systems can include systems such as, but are not limited to, computing systems, stereo systems, media systems, computer gaming systems, portable gaming systems, data storage systems, data transmission systems, data access systems, and/or automotive systems, to name a few.

An exemplary data storage system includes a device having at least one medium for data storage. The data storage system can include one or more types of storage mediums such as, but not limited to, hard discs, floppy discs, magnetic discs, optical discs, magnetic tapes, solid-state storage components, and/or combinations thereof. For instance, an exemplary data storage system can comprise a hard disc drive (HDD), a solid-state drive (SDD), a "hybrid" drive (e.g., a hybrid hard drive (HHD)), to name a few. The data storage system includes a controller that is configured to receive data and commands from a host and implement data operations to the storage media in the data storage device based on the commands.

Data systems (such as data storage systems, for example) typically include one or more maintenance operations. For instance, maintenance operations can be defined by a manufacturer. Some maintenance operations are configured to be performed during operation of the data storage system, such as during boot-up and/or during idle periods (e.g., background maintenance operations).

The discussion above is merely provided for general background information and is not intended to be used as an aid in determining the scope of the claimed subject matter.

SUMMARY

The present disclosure relates to performing maintenance operations in a data system using configurable parameters. In one exemplary embodiment, a method in a data system is provided. The method includes receiving an indication of a data latency threshold and performing at least one maintenance operation in the data system based on the data latency threshold.

In one exemplary embodiment, a data system is provided. The data system includes an interface for receiving data and commands from a host. The data system is configured to receive an indication of a data latency threshold from the host. The data system also includes at least one data resource and a controller configured to perform at least one data command received from the host to the at least one data resource based on the indication.

In one exemplary embodiment, a system configured to communicate with a data storage device is provided. The system includes a processor configured to identifying a status of the system and determining a data latency threshold based on the status. The system includes an interface for transmitting the data latency threshold to the data storage system.

These and various other features and advantages will be apparent from a reading of the following detailed description.

BRIEF DESCRIPTION OF THE DRAWINGS

FIG. 5 is a flow diagram of a method for performing a maintenance operation in a data system

DETAILED DESCRIPTION

The present disclosure relates generally to maintenance operations within data systems and more specifically, but not by limitation, to using configurable parameters to perform maintenance operations in a data storage system.

Many data systems, such as data storage systems, employ maintenance operations to protect system integrity and improve system reliability and performance. For instance, a maintenance operation in a data storage system (such as a hard disc drive, a solid-state drive (SSD), ect.) can be defined by a system manufacturer. Some maintenance operations are configured to be performed during operation of the data storage system, such as during boot-up. Some maintenance operations are configured to be performed during idle periods (e.g., background maintenance operations). In one example, a maintenance operation can include an operation performed within the data system that is not directly related to a host command. For instance, in a data storage system a maintenance operation can comprise any process performed within the data storage system that is not in response to a host command for data (e.g., a read command, a write command) issued by a host.

Examples of maintenance operations that can be performed in a data storage system include, but are not limited to, calibration and formatting functions, data organization tasks (such as data moves, defragmenting, etc.), and/or recovery of corrupted data. For instance, in a solid-state drive maintenance activities can include tasks related to wear-leveling, data formatting, data moves, and/or data block erasures, to name a few. In another instance, in a hard disc drive maintenance activities can include servo calibrations, off-line read scans, and/or task related to S.M.A.R.T. (Self-Monitoring, Analysis, and Reporting Technology) protocols, to name a few.

Some maintenance operations comprise "background" activities that are performed when the data system is idle and not servicing a host command request, for example. Further, some maintenance operations are essentially uninterruptable. For instance, interrupting certain maintenance operations can result in errors that can have a negative impact on performance of the data system. In some cases, these errors can result in failure of the data system. Thus, in some instances when a maintenance operation is begun the data system must hold off on servicing important host requests until after a time when the maintenance operation completes, which can result in undesirable degradation in system performance.

In accordance with one embodiment described herein, configurable parameters are utilized to control implementation of maintenance operations in a data system.

Figure 1:
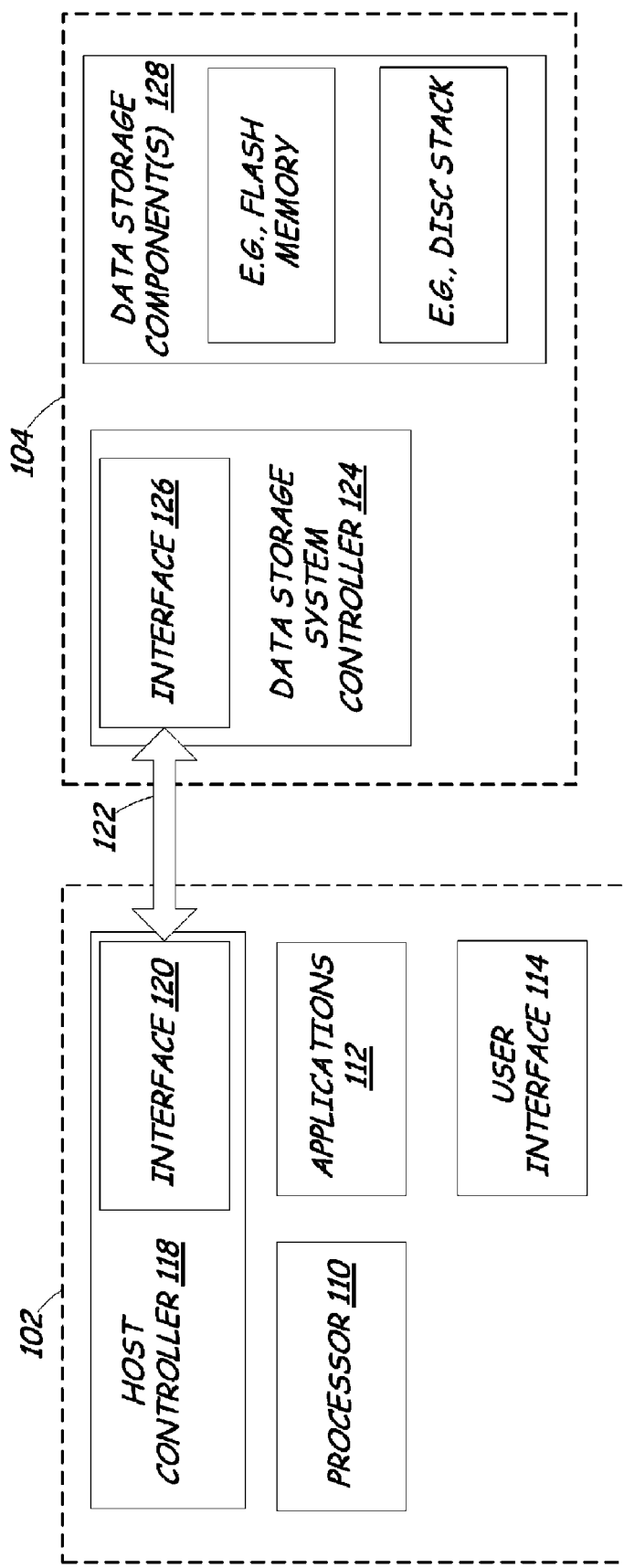
FIG. 1 is a schematic diagram of an exemplary data system, under one embodiment.

FIG. 1 is a schematic diagram of an exemplary data system, under one embodiment. As illustrated, the data system comprises a data storage system 104 that includes at least one data storage device. However, any type of data system is within the scope of the concepts described herein.

Data storage system 104 is communicatively coupled to a host 102. Host 102 can include any device, component, system, sub-system, application, and the like, that communicates (e.g., sends, receives, accesses, requests, processes data) with data storage system 104. In one example, host 102 comprises a computing device such as, but not limited to, a personal computer, laptop computer, server, portable electronic device, mobile device, digital music player, mobile phone, personal digital assistant (PDA), to name a few. It is noted that data storage system 104 can be included within or can be external to host 102. For example, in one embodiment data storage system 104 comprises a data storage drive, such as, but not limited to, a hard disc drive (HDD), a solid-state drive (SDD), a "hybrid" drive (e.g., a hybrid hard drive (HHD)), and the like, that is coupled to the host 102 using any suitable type of data connection.

Data storage system 104 includes a controller 124 that is configured to communicate with the host 102 through a data channel 122. Data channel 122 is communicatively coupled to an interface 126 of controller 124 and an interface 120 of host controller 118. The communication of data between host 102 and data storage system 104 can utilize any suitable communication protocol, including serial and/or parallel bus interface standards. For example, data channel 122 can include one or more communication busses using data transfer technologies such as, but not limited to, ATA (AT Attachment), SATA (Serial ATA), PATA (Parallel ATA), SCSI (Small Computer System Interface), SAS (Serial Attached SCSI), Universal Serial Bus (USB), IEEE 1394 interface, and/or Fibre Channel (FC), to name a few.

Data storage system 104 includes one or more data resources (e.g., data storage devices). In the illustrated embodiment, data storage system 104 includes a data storage component 128 having one or more types of storage media. The storage component 128 can include solid-state and/or non-solid-state memory. Examples of storage media in a non-solid-state storage device include, but are not limited to, floppy discs, hard discs, magnetic discs, optical discs, and/or magnetic tapes, to name a few. Examples of solid-state storage include, but are not limited to, semiconductor-based devices such as flash memory and the like. Controller 124 is configured to provide data to and receive data from storage component 128.

Host 102 also includes a processor 110 and one or more applications 112. In one embodiment, host 102 can also include a user interface 114. Interface 114 can include input devices, such as a keyboard, mouse, trackball, microphone, etc., and output devices, such as speakers, visual display devices, tactile feedback devices, etc.

Using processor 110, host 102 generates host commands that are transmitted to data storage system 104 using controller 118. The host commands include commands for data operations, such as data requests, data read operations, data write operations, to name a few. The host commands generated by host 102 can be in response to input from a user and/or operation of application(s) 112, for example. The host commands transmitted from host 102 are received by controller 124 of data storage system 104, which is configured to provide data to and receive data from data storage components 128.

Figure 2:
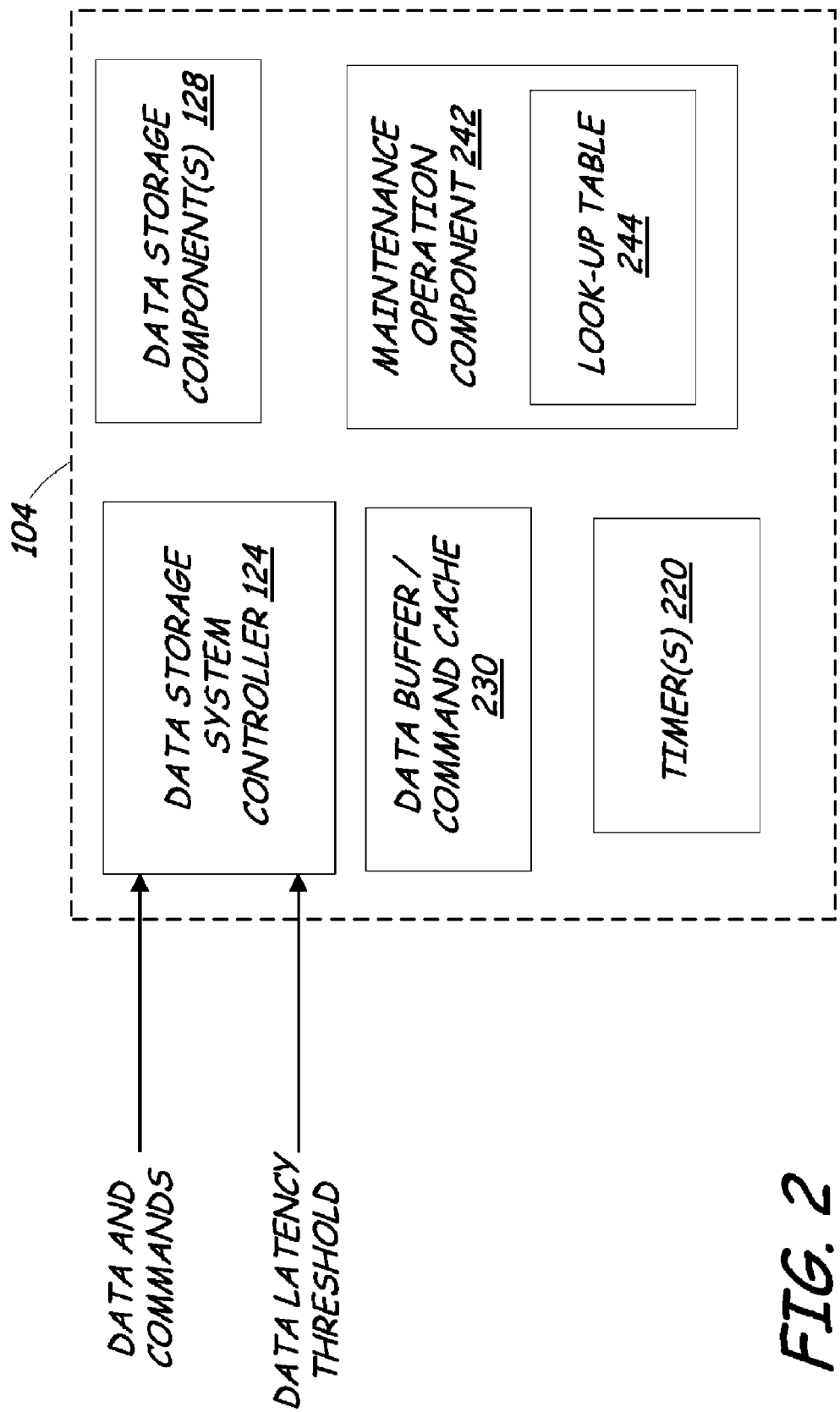
FIG. 2 is a schematic diagram of the data storage system illustrated in FIG. 1, under one embodiment.

FIG. 2 is a schematic diagram of the data storage system 104 illustrated in FIG. 1, under one embodiment. As illustrated in FIG. 2, controller 124 receives data and commands from the host 102. Data storage system 104 includes a data buffer and/or command cache 230 that is used to store some or all of the data and commands received by controller 124. Buffer/cache 230 can also be used to store data acquired from data storage component(s) 128.

In accordance with one embodiment, data storage system 104 includes a maintenance operation component 242 that is configured to perform one or more maintenance operations. Component 242 includes logic that is implement in hardware, software, and/or firmware and defines how and/or when maintenance operations are performed in data storage system 104. Maintenance operation component 242 can be included in controller 124 and/or can be separate from and accessed by controller 124 to perform the maintenance operations, for example.

In accordance with one embodiment, data storage system 104 includes configurable parameters that are used to perform maintenance operations within data storage system 104. In one embodiment, the parameters are configured based on an indication received from the host 102.

In the embodiment illustrated in FIG. 2, an indication of a data latency threshold is received from the host 102 at controller 124. The data latency threshold is transmitted, for example, over channel 122 illustrated in FIG. 1. In one particular example, the data latency threshold is transmitted over a SATA bus to a SATA interface of controller 124 using special or "vendor unique" commands. In accordance with one embodiment, the data latency threshold is mapped to a "set features" command. The data latency threshold can be transmitted with and/or separately from data and commands received from the host 102. For instance, in one example the data latency threshold is transmitted by controller 120 separately and/or independently from commands for data operations sent from host 102. The data latency threshold can be transmitted over the same and/or different physical interface as commands and user data transmitted from host 102.

In accordance with one embodiment, the data latency threshold relates to a maximum, allowed latency (i.e., time delay) between the issuance of a data command for a data operation to data storage system 104 and completion of that data operation by data storage system 104. For example, in one embodiment the data latency threshold comprises a host indication of a maximum allowed completion time for subsequent data commands received from the host 102. In one particular example, the data latency threshold relates to a maximum allowed time period from the issuance of a data command from the host 102 and the receipt of a "command complete" signal from the data storage system 104.

In accordance with one embodiment, the data storage system 104 performs maintenance operations based on the data latency threshold defined by and received from the host 102. For example, data storage system 104 selects and implements one or more maintenance operations that can be completed such that the requirements imposed by the data latency threshold are met for subsequent commands received from the host. For instance, the data storage system 104 selects one or more maintenance operations that can be initiated and completed during a time frame that is short enough to ensure that a command received during (or before) performance of the maintenance operation(s) can be performed within the data latency threshold defined by the host 102.

For example, when an indication of a data latency threshold is received from the host 102, data storage system 104 calculates an available time frame for performing maintenance operations. The time frame can then be used to select the maintenance operation(s) to be performed. For instance, in one embodiment a time frame for performing maintenance operation(s) can be calculated based on expected completion times for subsequent commands. In one particular example, an available time frame for performing maintenance operations can be calculated by subtracting an expected time to complete subsequent command(s) from the data latency threshold. The expected completion time can comprise, but is not limited to, a time value that is calculated by controller 124 based on completion times for prior commands, a time value that is provided by the host, a time value that is predefined, etc.

In one embodiment, maintenance operation component 242 includes a lookup table 244. Table 244 includes entries pertaining to a plurality of maintenance operations that can be performed within data storage system 104. In one embodiment, each entry in lookup table 244 pertains to a particular maintenance operation and includes an estimated completion time for that maintenance operation. Maintenance operation component 242 selects one or more maintenance operations from lookup table 244 based on the data latency threshold.

In accordance with one embodiment, data storage system 104 also includes one or more timers 220. For each data command received from the host, a timer is initialized to track an elapsed time from receipt of the data command. Thus, when a plurality of data commands are received from the host 102, a different timer can be initialized for each of the data commands. The timer is utilized by data storage system 104 to determine if maintenance operations can be performed such that the data latency threshold is satisfied for the data command. To illustrate, in one example a data command is received while a first maintenance operation is being performed in data storage system 104. A timer is initialized for the data command. When the first maintenance operation is completed, the data storage system looks to the timer to determine if enough time remains to implement a second maintenance operation (based on the data latency threshold).

Using the data latency threshold, the host 102 can configure parameters in the data storage system 104 to specify the allowed maximum data latency for subsequent data commands based on, for example, the current and/or future status of the host 102. The host 102 can thus set the allowed maximum data latency such that the performance of maintenance operations in the data storage system 104 does not have an undesired negative impact on operation of the host 102 (e.g., the host sets the data latency threshold such that the data storage system 102 does not take too long to complete host data requests) and/or does not overly compromise recovery time related to completion of maintenance operations in the data storage system 104. In this manner, the host 102 can communicate the least invasive times for performing maintenance operations in the data storage system 104.

As the operating conditions or status of the host 102 changes (for example, as a process of the host 102 changes), the host 102 can issue a new or updated data latency threshold to the data storage system 104. For example, the host 102 can set a low or minimum data latency threshold when the host is under heavy load (for instance, during a boot process) and/or when important data commands are to be issued that require short completion times. Examples of low or minimum data latency thresholds include, but are not limited to, 100 μs, 1 ms, 10 ms, etc. In one example, the host 102 sets a minimum data latency threshold of 0. In this instance, the data storage system 104 does not perform any maintenance operations.

As the status of the system changes, the host 102 can increase the data latency threshold (for example, to an intermediate value) to allow short duration maintenance operations to occur. Examples of intermediate data latency thresholds include, but are not limited to, 100 ms, 500 ms, 1 s, etc. Similarly, the host 102 can increase the data latency threshold to a high or maximum level (for example, when the host 102 determines that there has been prolonged user inactivity, etc.). Setting the data latency threshold to a high or maximum level allows the data storage system 104 to perform longer duration maintenance operations during a time in which there is a reduced possibility of receiving a data access command, etc.

Examples of high data latency thresholds include, but are not limited to, thresholds greater than 1 s.

Figure 3:
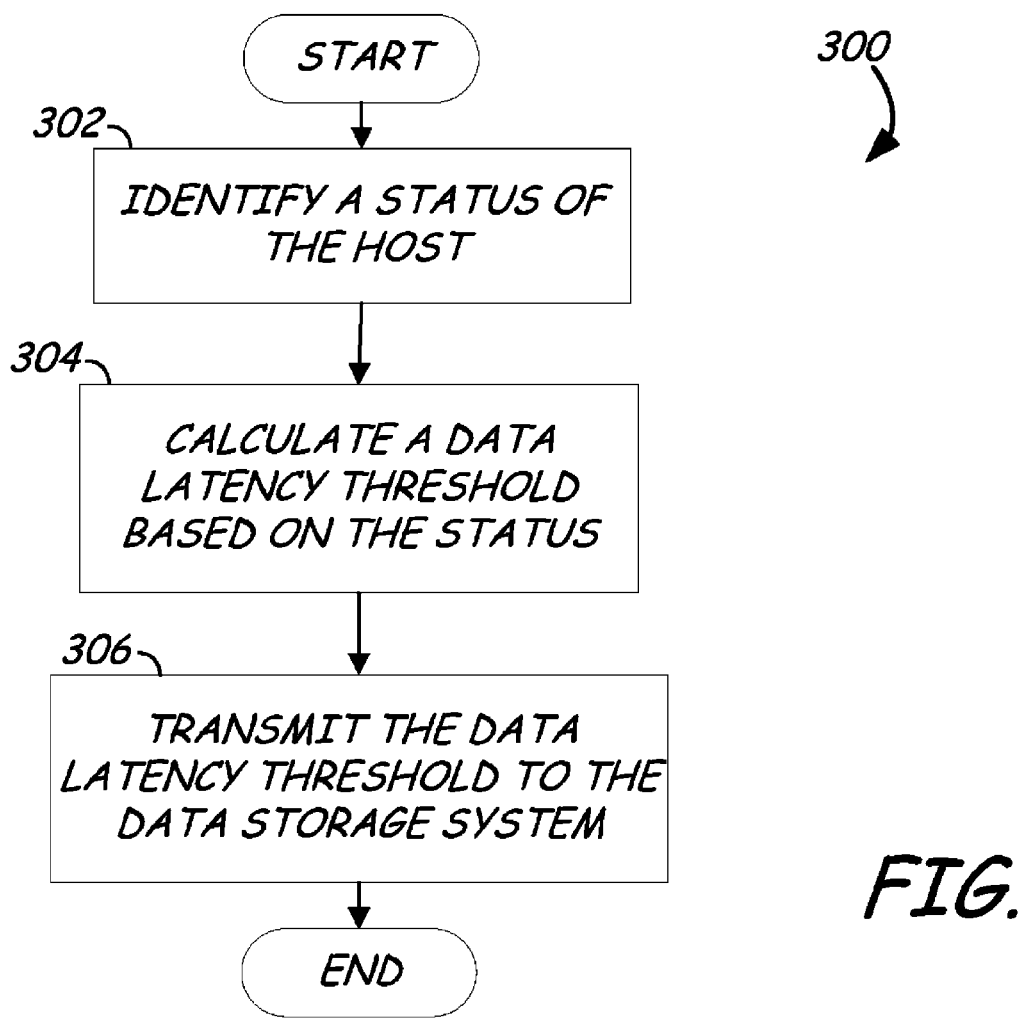
FIG. 3 is a flow diagram of a method for transmitting a data latency threshold to a data system.

FIG. 3 is a flow diagram illustrating a method 300 for providing a data latency threshold to a data system, under one embodiment. It is noted that while method 300 is described in the context of host 102 and data storage system 104, it is not intended to limit the scope of the concepts described herein.

At step 302, a status of the host 102 is identified. The status can relate to a current operating condition of the host and/or can relate to a future, expected operating status of the host. Based on the identified status, the host 102 calculates a data latency threshold at step 304. In one example, the host 102 determines that a host boot process is occurring, or about to occur, and sets the data latency threshold to a low or minimum value. In another example, the host can be configured to set a low or minimum data latency threshold when the host 102 determines that important data operations are occurring, or about to occur. In one example, host 102 sets a high or maximum data latency threshold if the host 102 determines that a prolonged period of user inactivity has occurred. At step 306, the host 102 transmits the data latency threshold to the data storage system 104.

Figure 4:
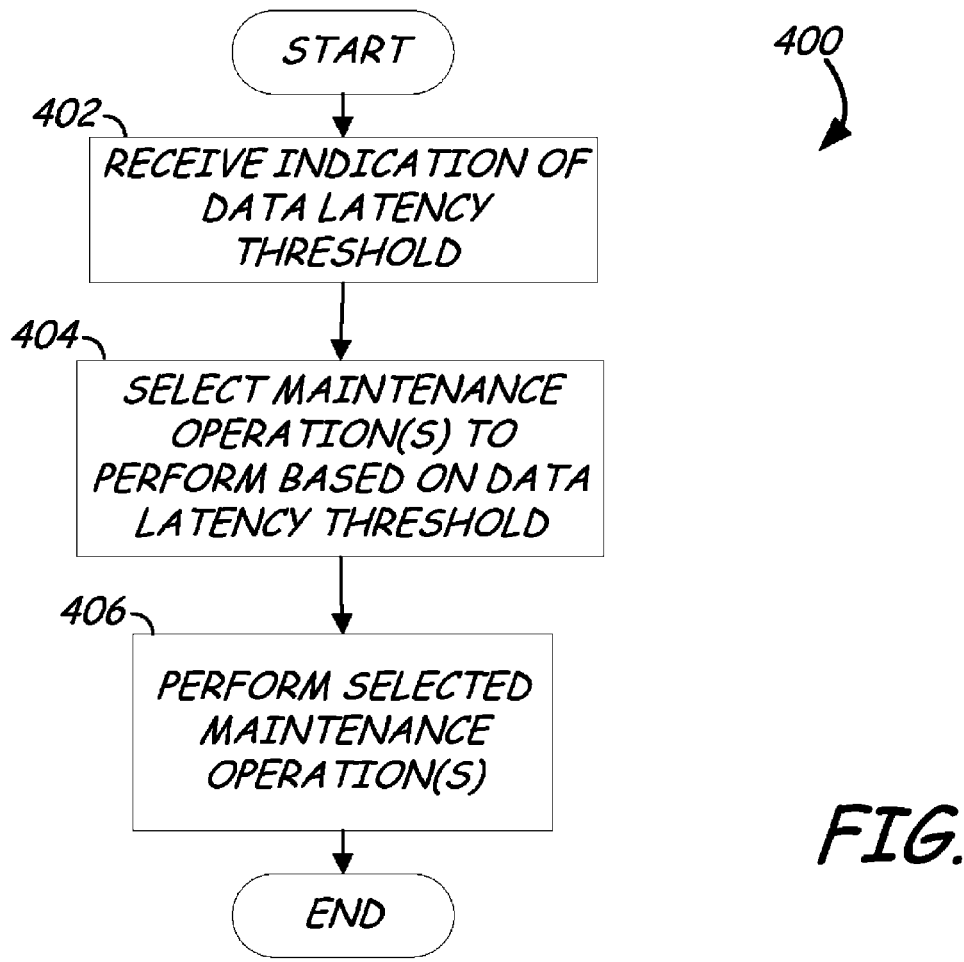
FIG. 4 is a flow diagram of a method for performing a maintenance operation in a data system.

FIG. 4 is a flow diagram of a method 400 for implementing a maintenance operation in a data system, under one embodiment. It is noted that while method 400 is described in the context of host 102 and data storage system 104, it is not intended to limit the scope of the concepts described herein.

At step 402, an indication of a data latency threshold is received by the data storage system 104. In one embodiment, the indication includes a time value indicative of a maximum data latency for subsequent commands received from the host 102. For example, the indication includes a numeric value indicative of the maximum data latency (e.g., 1 ms, 10 ms, 100 ms, 1,000 ms, etc.) for completing subsequent data command(s).

At step 404, one or more maintenance operations to be performed are selected based on the data latency threshold received at step 402. In one embodiment, step 404 includes calculating an available time frame for performing the at least one maintenance operation based on the data latency threshold and an expected completion time for the subsequent data command(s). For example, step 404 can calculate a time frame by subtracting an expected completion time for a subsequent data command from the data latency threshold received at step 402. The calculated time frame thus indicates an amount of time that the data storage system 104 has to complete maintenance operation(s) such that any subsequent data operations received are performed within the data latency threshold. Based on the calculated time frame, the maintenance operation(s) are selected from lookup table 244, for example.

The selected maintenance operation(s) are performed at step 406. Data commands that are received while the maintenance operation(s) are performed at step 406 are cached (for example, in command cache 230) until the maintenance operation(s) complete. In one embodiment, each data command received from the host 102 while the maintenance operation(s) are being performed are associated with a timer. The timer is initiated when the data command is received and is used track the amount of time from when the command was issued by the host 102. For multiple commands received from the host 102, multiple timers can be initiated. The method can proceed to select and perform additional maintenance operations, for example if no data commands are received and/or after received data commands have been completed.

FIG. 5 illustrates another method 500 for performing data operations in a data system, under one embodiment. It is noted that while method 500 is described in the context of host 102 and data storage system 104, it is not intended to limit the scope of the concepts described herein.

At step 502, an indication of a data latency threshold is received. At step 504, the method determines whether a data command has been received. If no data command has been received, the method proceeds to step 506 wherein one or more maintenance operations are selected and performed based on the received data latency threshold. In one embodiment, step 506 is substantially similar to steps 404 and 406 illustrated in FIG. 4.

If a data command is received at step 504, the method proceeds to step 508. At step 508, the method determines whether a maintenance operation can be performed given the current data latency threshold issued by the host 102. In one embodiment, the method accesses a lookup table of maintenance operations to determine if one or more maintenance operations can be performed given an expected completion time for the command received at step 504. If the method determines that no maintenance operations can be performed given the current data latency threshold, the method proceeds to step 512 wherein the data operation(s) received at step 504 are performed.

If step 508 determines that one or more maintenance operations can be performed given the current data latency threshold, the method proceeds to step 510 wherein the maintenance operation(s) are selected (for example from a lookup table) and performed. After the maintenance operation(s) are performed at step 510, the method proceeds to step 512 wherein the data operation received at step 504 is performed.

The method returns to step 504 wherein it is determined whether additional data commands have been received. In one embodiment, a new, updated data latency threshold is received and used for subsequent iterations of the method 500.

It is to be understood that even though numerous characteristics and advantages of various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed is:

1. A method in a data system, the method comprising:
   receiving, from a host, an indication of a data latency threshold;
   selecting at least one maintenance operation from a plurality of maintenance operations based on the data latency threshold;
   performing the at least one selected maintenance operation in the data system in conformance with the data latency threshold;
   receiving a data command from the host during performance of the at least one selected maintenance operation;
   determining if at least one additional maintenance operation from the plurality of maintenance operations can be performed given the data latency threshold and an expected completion time for the received command and, if so, performing the at least one additional maintenance operation; and
   performing and completing the received data command in conformance with the data latency threshold.

2. The method of claim 1, wherein the data latency threshold relates to a threshold time period for completing the data command received from the host.

3. The method of claim 1, wherein the data latency threshold relates to a time period from receipt of the data command within which the data command is to be completed.

4. The method of claim 1, wherein the indication received from the host includes a time value indicative of a maximum data latency period for each of a plurality of data commands received from the host.

5. The method of claim 1, wherein performing comprises:
   calculating a time frame for performing the at least one maintenance operation based on the data latency threshold and an expected completion time for the data command; and
   selecting the at least one maintenance operation from a plurality of maintenance operations based on the calculated time frame.

6. The method of claim 5, wherein calculating the time frame comprises subtracting the expected completion time for the data command from the data latency threshold.

7. The method of claim 5, wherein the at least one maintenance operation is selected from a look-up table based on the calculated time frame.

8. The method of claim 1, and further comprising:
   receiving the data command for a data operation from the host and, in response, initiating a timer for the data operation based on the data latency threshold.

9. The method of claim 1, and further comprising:
   receiving a plurality of data commands for a plurality of data operations from the host, wherein a timer is initiated for each of the plurality of data operations.

10. The method of claim 1, wherein the indication is mapped to a set features command of an ATA interface.

11. The method of claim 1, wherein the data system comprises a data storage system, and wherein the at least one maintenance operation comprises an operation that is not received as part of a command from the host.

12. The method of claim 1, wherein the data system comprises a data storage system, and wherein the at least one maintenance operation comprises a calibration operation within the data storage system.

13. The method of claim 1, wherein the data system comprises a data storage system, and receiving the indication of the data latency threshold from the host comprises receiving configuring parameters by the data storage system from the host for establishing data latency threshold settings in the data storage system.

14. The method of claim 1, wherein:
   receiving the data command comprises receiving a plurality of data commands during performance of the at least one selected maintenance operation;
   determining if at least one supplemental maintenance operation from the plurality of maintenance operations can be performed given the data latency threshold and expected completion times for the plurality of received data commands and, if so, performing the at least one supplemental maintenance operation; and
   performing and completing the plurality of received data commands in conformance with the data latency threshold.

15. A data system comprising:
- an interface for receiving, from a host, an indication of a data latency threshold and a data command for a data operation;
- at least one data resource; and
- a controller configured to:
  - select at least one maintenance operation from a plurality of maintenance operations based on the data latency threshold;
  - perform the at least one selected maintenance operation in conformance with the data latency threshold;
  - during performance of the at least one selected maintenance operation, receive the data command for the data operation;
  - determine if at least one additional maintenance operation from the plurality of maintenance operations can be performed given the data latency threshold and an expected completion time for the data operation and, if so, perform the at least one additional maintenance operation; and
  - perform and complete the data operation to the at least one resource in conformance with the data latency threshold.

16. The data system of claim 15, wherein the data latency threshold relates to a threshold time period for completing the data command received from the host.

17. The data system of claim 15, wherein the controller is configured to calculate a time frame for performing the at least one maintenance operation in the data system based on the data latency threshold and an expected completion time for the data command, wherein the controller selects the at least one maintenance operation from a plurality of maintenance operations based on the calculated time frame.

18. The data system of claim 15, wherein the data system comprises a data storage system, and wherein the at least one maintenance operation comprises a calibration operation within the data storage system.

19. The data system of claim 15, wherein the indication of the data latency threshold received from the host comprises configuration parameters for establishing data latency threshold settings in the data storage system.

20. The data system of claim 15, wherein the indication of the data latency threshold received from the host comprises configuration parameters for establishing data latency threshold settings in the data storage system that indicate least invasive times for performing the at least one maintenance operation or to avoid compromising recovery time related to completion of the at least one maintenance operation.

21. The data system of claim 15, wherein:
- the interface is configured to receive a plurality of data commands associated with a plurality of data operations during performance of the at least one selected maintenance operation; and
- the controller is configured to determine if at least one supplementary maintenance operation from the plurality of maintenance operations can be performed given the data latency threshold and expected completion times for the plurality of data operations and, if so, perform the at least one supplementary maintenance operation, and perform and complete the plurality of data operations to the at least one data resource in conformance with the data latency threshold.

* * * * *